(12) United States Patent
List (10) Patent No.: US 11,708,901 B2
(45) Date of Patent: Jul. 25, 2023

(54) PARKING LOCK FOR A MOTOR VEHICLE

(71) Applicant: ZF Friedrichshafen AG, Friedrichshafen (DE)

(72) Inventor: Matthias List, Friedrichshafen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 145 days.

(21) Appl. No.: 17/337,925

(22) Filed: Jun. 3, 2021

(65) Prior Publication Data

US 2021/0381595 A1 Dec. 9, 2021

(30) Foreign Application Priority Data

Jun. 4, 2020 (DE) ...................... 10 2020 206 988.3

(51) Int. Cl.
*F16H 63/34* (2006.01)
*F16H 63/36* (2006.01)

(52) U.S. Cl.
CPC ......... *F16H 63/3433* (2013.01); *F16H 63/36* (2013.01)

(58) Field of Classification Search
CPC ....... F16H 63/34; F16H 63/3433; F16H 63/36
See application file for complete search history.

(56) References Cited

U.S. PATENT DOCUMENTS 8,985,295 B2 * 3/2015 Reichert ................. F16H 61/24
192/219.5

FOREIGN PATENT DOCUMENTS

| DE | 102018206016 A1 | 12/2018 | |
|----|-----------------|---------|---|
| DE | 102017123079 A1 * | 4/2019 | |
| DE | 102018130315 A1 | 10/2019 | |
| DE | 102019101467 A1 | 10/2019 | |
| WO | WO-2009047520 A2 * | 4/2009 | ......... F16H 63/3416 |
| WO | WO 2020/103981 | 5/2020 | |

OTHER PUBLICATIONS

German Search Report 10 2020 206 988.3, dated Mar. 22, 2021, (10 pages).

* cited by examiner

*Primary Examiner* — Lori Wu
(74) *Attorney, Agent, or Firm* — Dority & Manning, P.A.

(57) ABSTRACT

A parking lock for a motor vehicle includes a pivotably mounted locking pawl (20), an interlocking element (60), and a guide rod (40). A spring element (80) preloads the locking pawl (20) in a disengagement direction of the parking lock. A first free end (83) of the spring element (80) is supported directly on a support section (24) of the locking pawl (20) and, during the swiveling of the locking pawl (20), rests against the support section (24) in a stationary manner. A second free end (85) of the spring element (80) is supported directly on a support contour (43) of the guide rod (40) and, during an axial movement of the guide rod (40), slides along the support contour (43). The geometry of the support contour (43) is configured such that the preload force of the spring element (80) does not decrease during the disengagement of the parking lock.

13 Claims, 4 Drawing Sheets

PARKING LOCK FOR A MOTOR VEHICLE

CROSS-REFERENCE TO RELATED APPLICATION

The present application is related and has right of priority to German Patent Application No. 102020206988.3 filed in the German Patent Office on Jun. 4, 2020, which is incorporated by reference in its entirety for all purposes.

FIELD OF THE INVENTION

The present invention relates generally to a parking lock for a motor vehicle.

BACKGROUND

Parking lock mechanisms for motor vehicles are widely known from the prior art. They usually include a locking pawl, which is pivotably mounted on a pawl pin secured at a housing, the ratchet tooth of which engages into or disengages from a parking interlock gear acting upon wheels of the motor vehicle, and an interlocking element, which is axially displaceable by an actuating device and, in the interlocked condition, is clamped between the locking pawl and a housing-affixed guiding plate, in order to prevent the locking pawl from being pushed out of a tooth space of the parking interlock gear.

DE 10 2018 130 315 A1 and DE 10 2019 101 467 A1 describe, for example, a parking lock, in which the locking pawl, viewed spatially, is arranged in a suspended manner and, viewed spatially, is therefore above the parking interlock gear. Here, the interlocking element is designed as a roller system, including two rollers rolling onto each other, which are rotatably mounted in a roller carriage, wherein one of these two rollers faces the locking pawl, but the other of the two rollers faces the guiding plate. The guiding plate is a component of a support, which is bolted to the housing and accommodates the pawl pin. The actuating device mechanically acts upon the roller carriage.

In the parking lock represented in DE 10 2018 130 315 A1, the actuating device is designed as an electric motor-operated drive with a crank gear, which acts upon the roller carriage via a guide rod. For this purpose, the guide rod is hung with an end facing the rollers into the roller carriage, whereas the end of the guide rod facing away from the rollers extends through a bore hole of the support and, thereby, is axially displaceably mounted at the housing-affixed support. In the parking lock represented in DE 10 2019 101 467 A1, the actuating device acts directly upon the roller carriage, wherein, in this case as well, a guide rod connected to the roller carriage is provided, the end of which facing away from the rollers extends through a bore hole of the support and, thereby, is axially displaceably mounted at the housing-affixed support. In both parking locks, an engagement spring designed as a compression spring is mounted between the bearing section of the support and the roller carriage and concentrically encloses the guide rod and preloads the roller carriage in the direction leading toward the engagement of the parking lock.

In both parking locks, therefore, a return spring designed as a leg spring is provided, the coils of which concentrically enclose a section of the pawl pin, wherein one free end of the leg spring is supported directly on the locking pawl, whereas the other free end of the leg spring is supported directly on the housing-affixed support. Therefore, the disengagement spring preloads the locking pawl in the direction leading toward the disengagement of the parking lock. If the parking lock is in the disengaged condition, the preload force of the return spring prevents the locking pawl from dropping toward the parking interlock gear due to gravity.

Accordingly, in both parking locks, an engagement of the parking lock takes place by spring force of the engagement spring against the spring force of the return spring. A disengagement of the parking lock, however, takes place by the actuation force of the actuating device with support of the spring force of the return spring against the spring force of the engagement spring.

The disadvantage of this design and arrangement is the comparatively high spring forces for holding the parking lock in the disengaged condition, since the inertial forces of the locking pawl inherently act in the engagement direction of the parking lock. This is made difficult by the fact that the pawl return spring loses preload due to the fixed suspension at the housing-affixed support and at the locking pawl when the locking pawl carries out a swiveling motion leading toward the disengagement of the parking lock. This can result in problems with respect to holding the locking pawl in the disengaged condition, in particular for the case in which the motor vehicle is highly dynamically operated and the disengagement spring is dimensioned in such a way that a comparatively low actuation force is necessary in order to engage the parking lock.

BRIEF SUMMARY OF THE INVENTION

Example aspects of the present invention further develop a parking lock of the type mentioned at the outset, in particular with regard to the actuation forces.

Accordingly, example aspects of the invention provide a parking lock for a motor vehicle, which includes a locking pawl, a parking interlock gear, an interlocking element, a housing-affixed guiding plate, a guide rod, an actuating device, and a spring element. The locking pawl is pivotably mounted on a pawl pin and engages into or disengages from the parking interlock gear acting upon wheels of the motor vehicle depending on the engagement position. The interlocking element is axially displaceable in order to engage and disengage the parking lock. In the engaged condition of the parking lock, the interlocking element is clamped between the locking pawl and the housing-affixed guiding plate, in order to prevent the locking pawl from being pushed out of a tooth space of the parking interlock gear. The actuating device acts upon the interlocking element in the axial direction in order to disengage the parking lock. The guide rod is connected or operatively connected to the interlocking element and is displaced axially, i.e., in the longitudinal direction, during the engagement and disengagement of the parking lock. The spring element preloads the locking pawl in the disengagement direction of the parking lock, and so the engagement of the parking lock takes place against the spring force of the spring element.

According to example aspects of the invention, it is provided that the spring element is supported, with a first free end of the spring element, directly on a support section of the locking pawl and, with a second free end of the spring element, is supported directly on a support contour of the connecting rod.

The first free end of the spring element rests against the support section of the locking pawl in a stationary manner. Therefore, the spatial position change that the first free end of the spring element undergoes when the locking pawl swivels starting from the engaged condition toward the disengaged condition of the parking lock has a reducing effect on the preload force of the spring element, as in the prior art.

The second free end of the spring element, however, slides along the support contour of the connecting rod during an axial movement of the connecting rod. This translatory motion and/or spatial position change, which the second free end of the spring element undergoes when the connecting rod moves axially starting from the engaged condition toward the disengaged condition of the parking lock, increases the preload force of the spring element in a particularly advantageous way.

The geometry of the support contour is designed and/or configured, according to example aspects of the invention, in such a way that the translatory motion and/or spatial position change of the second free end of the spring element taking place during the disengagement of the parking lock generates a preload increase for the spring element, which at least compensates for the preload loss of the spring element caused by the swiveling of the locking pawl, and so the preload force of the spring element therefore does not decrease, in its entirety, during the disengagement of the parking lock.

Therefore, the parking lock concept according to example aspects of the invention eliminates the disadvantage from the prior art, in which a swiveling of the locking pawl during the disengagement of the parking lock results in a loss of the preload force of the spring element operating in the manner of a locking pawl disengagement spring or a locking pawl return spring.

If the spring element according to example aspects of the invention is to provide the same preload force for an existing parking interlock gear/locking pawl combination in the "parking lock engaged" condition as the return spring according to the prior art, example aspects of the invention enable protection, in a particularly advantageous way in the "parking lock disengaged" condition, against an unintentional swiveling motion of the locking pawl in the direction leading toward the engagement of the parking lock that is increased as compared to the prior art. This advantage is particularly valuable when the locking pawl is installed in a suspended manner.

If the spring element according to example aspects of the invention is to provide the same preload force for an existing parking interlock gear/locking pawl combination in the "parking lock disengaged" condition as the return spring according to the prior art, example aspects of the invention make an actuation force possible, in a particularly advantageous way, that is needed to disengage the parking lock that is reduced as compared to the prior art.

In addition, due to example aspects of the invention, the force characteristics setting in during the disengagement of the parking lock can be advantageously adapted to application-specific wishes by the support contour provided, according to example aspects of the invention, at the axially movable guide rod.

In a preferred first advantageous example embodiment of the invention, it is provided that the support contour, which is provided at the guide rod that is axially displaceable in order to engage and disengage the parking lock, is designed in such a way that the preload force of the spring element progressively increases during the disengagement of the parking lock. The increase of the preload force of the spring element during the disengagement of the parking lock therefore takes place depending on the support contour geometry and the axial displacement travel of the guide rod.

For this purpose, the support contour viewed in the axial direction of the guide rod—i.e., viewed in the longitudinal direction of the guide rod—can have a curvature that is designed to be convex, viewed in the direction of the housing-affixed guiding plate. The support contour, viewed in the axial direction and/or longitudinal direction of the guide rod, can be designed, for example, as a circle arc segment, the circle center of which, viewed spatially, is arranged on the side of the guide rod facing the locking pawl.

In a second advantageous example embodiment of the invention, it is provided that the support contour, which is provided at the guide rod that is axially displaceable during the engagement and disengagement of the parking lock, is designed in such a way that the preload force of the spring element remains constant or, alternatively, linearly increases during the disengagement of the parking lock.

For this purpose, the support contour, viewed in the axial direction of the guide rod—i.e., viewed in the longitudinal direction of the guide rod—can be designed as a straight line, which is slanted at an angle with respect to a central axis of the guide rod. The magnitude of the angle then defines the extent of compensation for the preload loss of the spring element generated during the swiveling of the locking pawl.

In a third advantageous example embodiment of the invention, it is provided that the support contour, which is provided at the guide rod that is axially displaceable in order to engage and disengage the parking lock, is designed in such a way that the preload force of the spring element degressively increases during the disengagement of the parking lock. The increase of the preload force of the spring element during the disengagement of the parking lock therefore takes place depending on the support contour geometry and the axial displacement travel of the guide rod.

For this purpose, the support contour, viewed in the axial direction and/or longitudinal direction of the guide rod, can have a curvature that is designed to be concave, viewed in the direction of the housing-affixed guiding plate. The support contour, viewed in the axial direction and/or longitudinal direction of the guide rod, can be designed, for example, as a circle arc segment, the circle center of which, viewed spatially, is arranged on the side of the guide rod facing away from the locking pawl.

In a structural example refinement of the invention, it is provided to design the spring element as a leg spring, the coils of which concentrically enclose a section of the pawl pin. In this case, a first leg of the leg spring is supported on the support contour of the guide rod in such a way that a free end of this first leg slides along the support contour during an axial movement of the guide rod, whereas a second leg of the leg spring is supported, with its free end, on the support section of the locking pawl in a stationary manner.

In order to engage the parking lock, an engagement spring can be provided, wherein a disengagement of the parking lock then takes place by the actuation force of the actuating element with support of the spring force of the spring element against the spring force of the engagement spring.

It can then be provided that the actuating device provided for disengaging the parking lock transmits the actuation force onto the interlocking element via the guide rod during the disengagement of the parking lock. Alternatively, it can also be provided, however, that the actuating device is connected or operatively connected to the interlocking element in an alternative manner and transmits the actuation force onto the interlocking element without the use of the guide rod during the disengagement of the parking lock.

BRIEF DESCRIPTION OF THE DRAWINGS

Example aspects of the invention are explained in greater detail in the following, by way of example, with reference to the attached figures. Wherein.

DETAILED DESCRIPTION

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

Figure 1A:
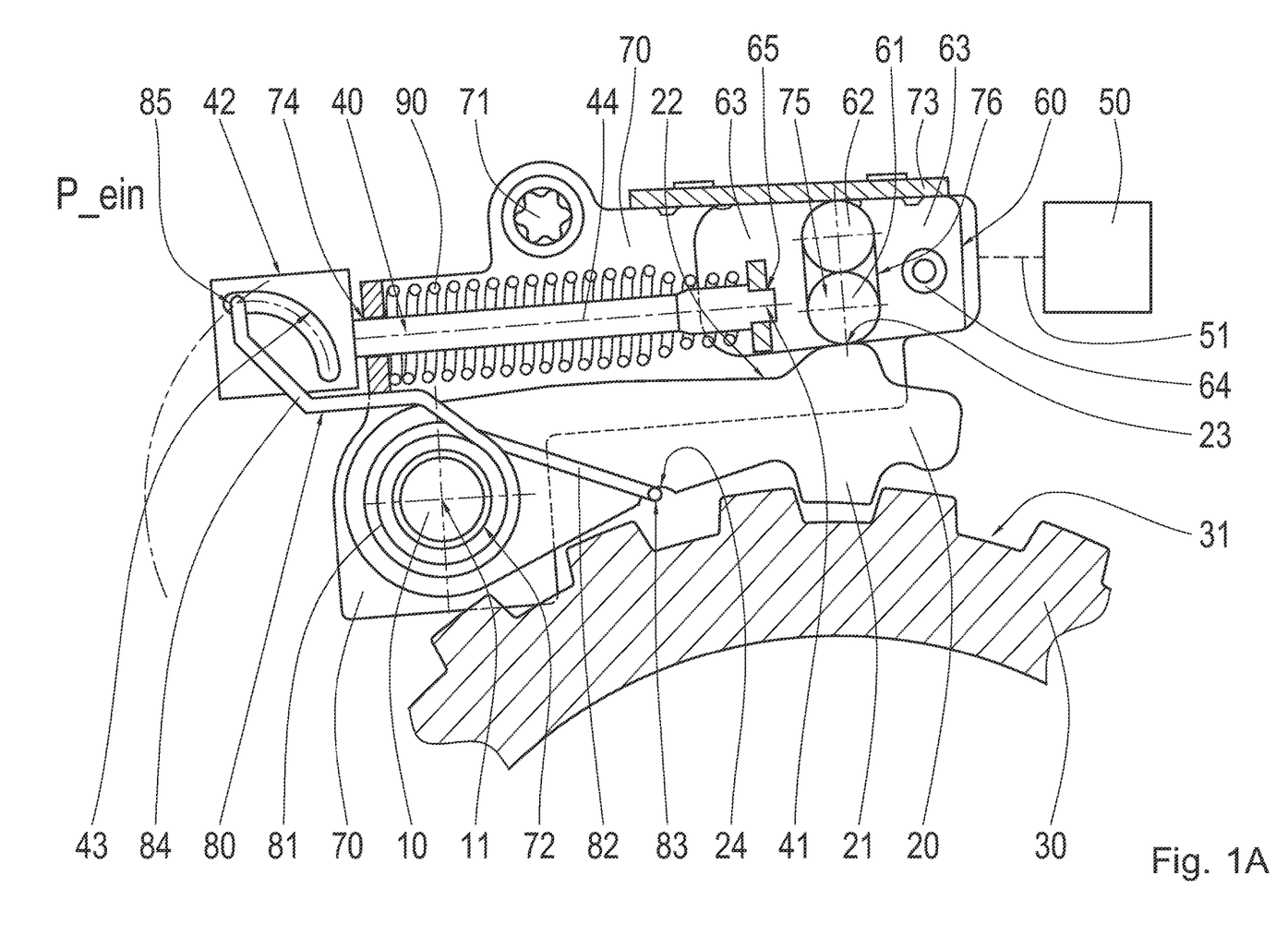
FIG. 1A shows a schematic of a first exemplary embodiment of a parking lock according to the invention in the "parking lock engaged" engagement position.
Figure 1B:
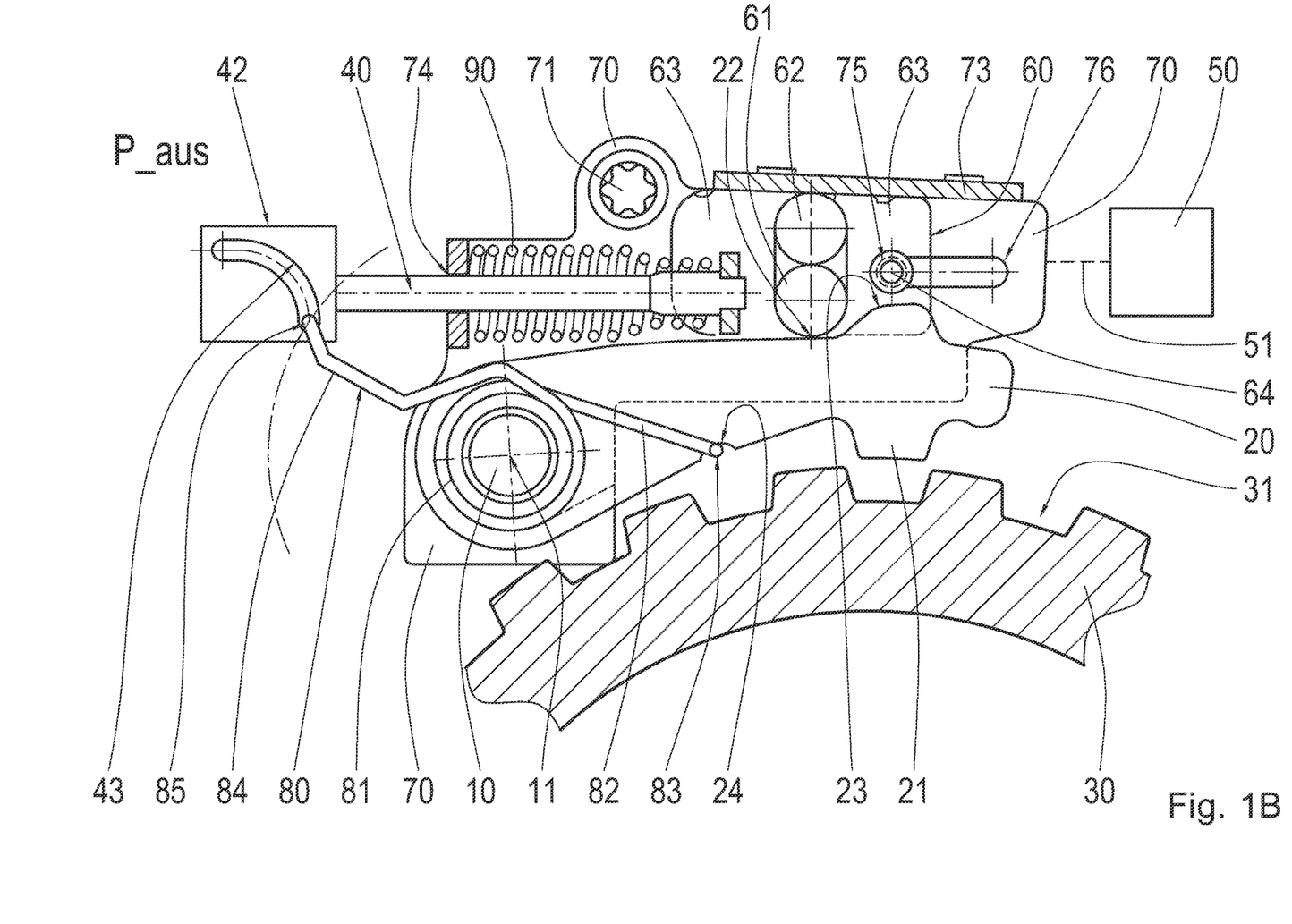
FIG. 1B shows the parking lock according to FIG. 1A in the "parking lock disengaged" engagement position.
Figure 1C:
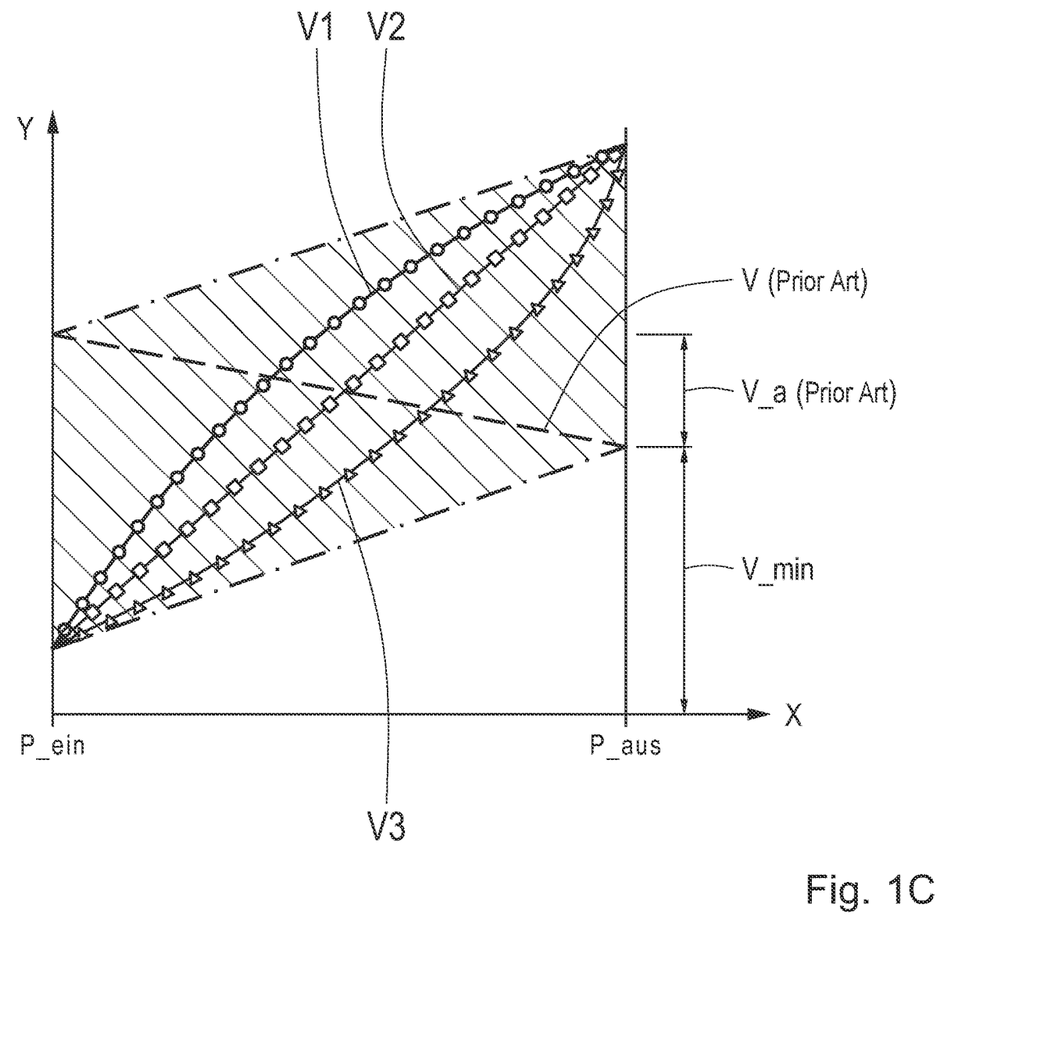
FIG. 1C shows a force/displacement diagram for the parking locks according to FIG. 1A, FIG. 2, and FIG. 3.

A preferred first exemplary embodiment of a parking lock according to example aspects of the invention for a motor vehicle is described in greater detail in the following and with reference to FIGS. 1A, 1B, and 1C. FIG. 1A shows the parking lock in the "parking lock engaged" engagement position, marked by the reference character P_ein. FIG. 1B, on the other hand, shows the parking lock in the "parking lock disengaged" engagement position, marked by the reference character P_aus. Finally, FIG. 1C shows a force/displacement diagram for the force characteristics of the spring element utilized in the first exemplary embodiment, by which the parking lock is held in the disengaged condition.

The parking lock shown in FIGS. 1A and 1B is based, structurally, on the parking lock known from DE 10 2019 101 467 A1 and includes a locking pawl 20, which is pivotably mounted on a pawl pin 10, the ratchet tooth 21 of which engages into or disengages from a tooth space 31 of a parking interlock gear 30, which is operatively connected to wheels of the motor vehicle, which are not represented here in greater detail, for the sake of simplicity. In the engaged condition, the parking lock secures the motor vehicle, in the usual way, against rolling away. In addition, the parking lock includes an interlocking element 60, which is axially displaceable in order to engage and disengage the parking lock and, in the engaged condition of the parking lock, is clamped between the locking pawl 20 and a housing-affixed guiding plate 73, in order to prevent the ratchet tooth 21 of the locking pawl 20 from being pushed out of a tooth space 31 of the parking interlock gear 30.

The interlocking element 60 is designed, by way of example, as an axially displaceable roller system including two rollers 61 and 62 rolling onto each other, which are rotatably mounted in a roller cage 63, wherein the first roller 61 faces the locking pawl 20 and rolls on contact surfaces 22, 23 of the locking pawl 20, whereas the second roller 62 faces the guiding plate 73 and rolls on a contact surface of the guiding plate 73. The guiding plate 73 is a component of a support 70, which is fixedly connected via a bolted connection 71 to a housing, which is not represented in greater detail here, for the sake of simplicity. Additionally, the housing-affixed support 70 also includes a pawl pin receptacle 72, into which the pawl pin 10 is inserted.

In order to disengage the parking lock, an actuating device 50 (merely diagrammatically represented here) is provided, which acts upon the interlocking element 60 in the axial direction via an operative connection 51 (also merely diagrammatically represented here) during the disengagement of the parking lock. For the structural design of the actuating device 50, diverse variants are available to a person skilled in the art, for example, an electric motor-operated actuator, an electro-hydraulic actuator, a pneumatically actuatable actuator, or even a mechanism that is manually actuatable by the operator of the motor vehicle. In order to be able to axially displace the interlocking element 60, the actuating device 50 mechanically acts, with the operative connection 51, upon the roller cage 63.

In order to engage the parking lock, an engagement spring 90 is provided, which preloads the interlocking element 60 in the direction leading toward the engagement of the parking lock. For this purpose, the engagement spring 90 is designed, by way of example, as a compression spring, which concentrically encloses a guide rod 40 which, for its part, is mechanically connected to the interlocking element 60 and is displaced axially, i.e., in the longitudinal direction, during the engagement and disengagement of the parking lock. A suspension section 41 of the guide rod 40 facing the roller cage 63 is inserted into a recess 65 of the roller cage 63 and connected to the roller cage 63 in a force-locking or form-locking manner. The engagement spring 90 is supported axially on the roller cage 63 in this area. On the side of the engagement spring 90 opposite this support area, the guide rod 40 extends through the support 70 at a bearing point 74, and so the engagement spring 90 is supported axially on the housing-affixed support 70 in the area of the bearing point 74. Therefore, the engagement spring 90 is axially tensioned between the roller cage 63 of the interlocking element 60 and a wall of the support 70. If the roller cage 63 is now axially displaced by the actuating device 50 starting from the parking lock engagement position P_ein into the parking lock engagement position P_aus, the pre-load force of the engagement spring 90 increases.

In order to hold the locking pawl 20 in the disengaged condition P_aus of the parking lock, a spring element 80 is provided, which is designed, by way of example, as a leg spring, the coils 81 of which concentrically enclose a longitudinal section of the pawl pin 11. A first leg 83 of the leg spring 80 includes, at a free end 83 of the leg spring 80, an angular bend, which extends axially parallel to the pawl pin 10 and, thereby, transversely to the locking pawl 20 and engages into a recess-like support section 24 of the locking pawl 20. In this way, the leg spring 80 is supported on the locking pawl 20 in a stationary manner during a swiveling of the locking pawl 20. A second leg 84 of the leg spring 80 includes, at a free end 85 of the leg spring 80, an angular bend, which also extends axially parallel to the pawl pin 10, but is arranged on the side of the locking pawl 20 positioned opposite the support section 24, i.e., facing the guide rod 40. Therefore, the cranked free end 85 extends at a right angle to the central axis 44 of the guide rod 40. According to example aspects of the invention, the cranked free end 85 of the second leg 84 of the leg spring 80 rests against and is supported on the axially movable guide rod 40 in a force-locking manner at a support contour 43 having a particular geometry, which is provided at a suspension section 42 of the guide rod 40. During an axial movement of the roller cage 63 and the guide rod 40, the cranked free end 85 of the second leg 84 of the leg spring 80 slides along this support contour 43, with the result that the cranked free end 85 undergoes a preload force-increasing, translatory motion and/or spatial position change.

In the first exemplary embodiment of a parking lock according to example aspects of the invention shown in FIGS. 1A and 1B, the geometry of the support contour 43 is designed and/or configured in such a way that the translatory motion and/or spatial position change of the second free end 85 of the spring element 80 taking place during the disengagement of the parking lock generates a preload increase for the spring element 80, which overcompensates for the preload loss of the spring element 80 caused by the swiveling of the locking pawl 20. For this purpose, the support contour 43, viewed in the direction of the central axis 44 of the guide rod 40, has a curvature that is designed to be convex, viewed in the direction of the guiding plate 73. The support contour 43, viewed in the axial direction and/or longitudinal direction of the guide rod 40, can be designed, by way of example, as a circle arc segment, the circle center of which, viewed spatially, is arranged on the side of the guide rod 40 facing the locking pawl 20.

In the end, this particular geometry of the support contour 43 ensures that the preload force of the spring element 80 progressively increases during the disengagement of the parking lock.

The engagement of the parking lock takes place by the spring force of the engagement spring 90 against the spring force of the spring element 80. The disengagement of the parking lock, however, takes place by the actuation force of the actuating element 50 with support of the spring force of the spring element 80 against the spring force of the engagement spring 90.

A structural detail of a second exemplary embodiment of a parking lock according to example aspects of the invention is described in greater detail in the following and with reference to FIG. 2. Represented here is the suspension section 42 with the support contour 43 of the guide rod 40. It is readily apparent that the second exemplary embodiment differs from the first exemplary embodiment by the particular geometry of the support contour 43, along which the second free end 85 of the spring element 80 slides when the guide rod 40 moves in the axial direction, i.e., along the central axis 44.

In the second exemplary embodiment of a parking lock according to example aspects of the invention, the geometry of the support contour 43 is designed and/or configured in such a way that the translatory motion and/or spatial position change of the second free end 85 of the spring element 80 (not shown here, for the sake of simplicity) taking place during the disengagement of the parking lock generates a preload increase, which compensates or overcompensates for the preload loss caused by the swiveling of the locking pawl 20. For this purpose, the support contour 43, viewed in the direction of the central axis 44 of the guide rod 40, is designed as a straight line, which is slanted at an angle 45 with respect to a central axis 44 of the guide rod 40.

In the end, this particular geometry of the support contour 43 ensures, depending on the size of the angle 45, that the preload force of the spring element (80) either remains constant or linearly increases during the disengagement of the parking lock.

A structural detail of a second exemplary embodiment of a parking lock according to example aspects of the invention is described in greater detail in the following and with reference to FIG. 3. It is readily apparent that the third exemplary embodiment differs from the first exemplary embodiment and from the second exemplary embodiment by the particular geometry of the support contour 43, along which the second free end 85 of the spring element 80 slides when the guide rod 40 moves in the axial direction, i.e., along the central axis 44.

In the third exemplary embodiment of a parking lock according to example aspects of the invention, the geometry of the support contour 43 is designed and/or configured in such a way that the translatory motion and/or spatial position change of the second free end 85 of the spring element 80 (not shown here, for the sake of simplicity) taking place during the disengagement of the parking lock generates a preload increase for the spring element 80, which degressively overcompensates for the preload loss of the spring element 80 caused by the swiveling of the locking pawl 20. For this purpose, the support contour 43, viewed in the direction of the central axis 44 of the guide rod 40, has a curvature that is designed to be concave, viewed in the direction of the guiding plate 73 (not shown here, for the sake of simplicity). The support contour 43, viewed in the direction of the central axis 44 of the guide rod 40, can be designed, by way of example, as a circle arc segment, the circle center of which, viewed spatially, is arranged on the side of the guide rod 40 facing away from the locking pawl 20 (not shown here, for the sake of simplicity).

In the end, this particular geometry of the support contour 43 ensures that the preload force of the spring element 80 degressively increases during the disengagement of the parking lock.

All three exemplary embodiments make it possible, in a particularly advantageous way, to optimize the spring rate of the spring element 80, by which the locking pawl 20, in the disengaged condition P_aus, is prevented from hurtling back toward the locking toothing of the parking interlock gear 30. FIG. 1C shows, for this purpose, an exemplary qualitative profile of the preload force change of the spring element 80 during a changeover between the parking lock engagement conditions P_ein and P_aus. The axial travel covered by the guide rod 40 between these two end positions P_ein and P_aus is plotted on the x-axis of the force-displacement diagram represented here, whereas the preload force V of the spring element 80 is plotted on the y-axis of the diagram. This preload force V is also an equivalent to the torque acting upon the locking pawl 20. The dashed line corresponds to a curve according to the prior art, wherein V_a marks the preload reduction (and/or locking pawl torque reduction), which arises due to the spatial position change of the first free end 83 of the spring element 80 during the swiveling of the locking pawl 20 from the engaged condition P_ein toward the disengaged condition P_aus of the parking lock. V_min marks the minimum preload force that the spring element 80 must provide (and/or the minimum torque at the locking pawl 20 that the spring element 80 must provide), in order to hold the locking pawl 20 in the position in the parking lock engagement condition P_aus.

The solid line with circles as a symbol represents an exemplary progressive preload force curve V1, which can set in and/or be structurally predefined when the first exemplary embodiment according to example aspects of the invention according to FIGS. 1A and 1B is utilized.

Figure 2:
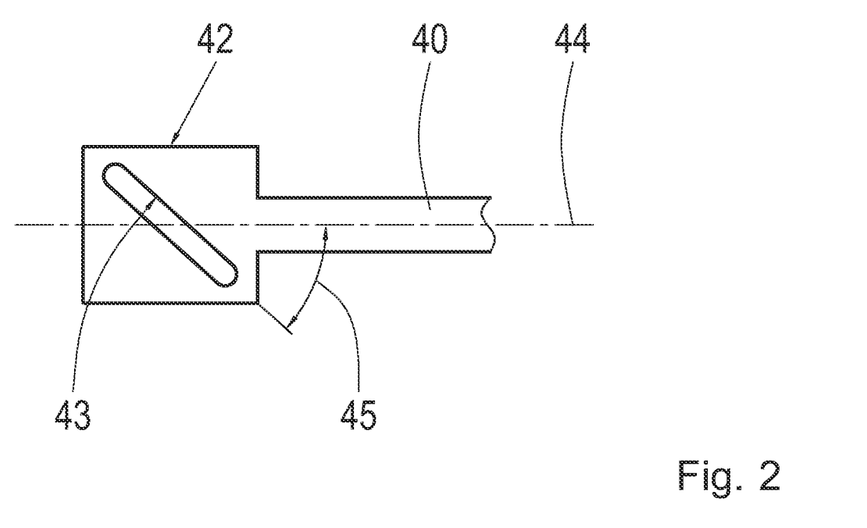
FIG. 2 shows a simplified schematic of a structural detail of a second exemplary embodiment of a parking lock according to the invention.

The solid line with squares as a symbol represents an exemplary linear preload force curve V2, which can set in and/or be structurally predefined when the second exemplary embodiment according to example aspects of the invention according to FIG. 2 is utilized.

Figure 3:
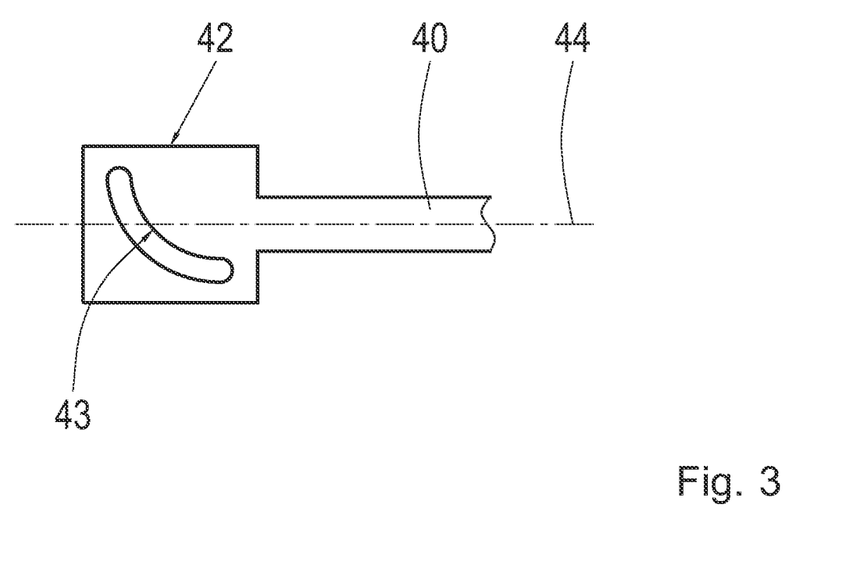
FIG. 3 shows a simplified schematic of a structural detail of a third exemplary embodiment of a parking lock according to the invention.

The solid line with triangles as a symbol represents an exemplary degressive preload force curve V3, which can set in and/or be structurally predefined when the third exemplary embodiment according to example aspects of the invention according to FIG. 3 is utilized.

Readily apparent and indicated in FIG. 1C as shading is the large structural leeway for the force-side design of the spring element 80 provided for holding the locking pawl 20 in the end position in the parking lock engagement condition P_aus, which is made available by the invention to a person skilled in the art. In addition to the possibility of achieving a safety-increasing preload gain at the locking pawl 20 in the parking lock engagement condition P_aus that is significant as compared to the prior art, it is also possible to achieve a comfort-improving actuation force reduction at the locking pawl 20 in the parking lock engagement condition P_ein that is significant as compared to the prior art.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS 10 pawl pin
11 pawl pin longitudinal axis; locking pawl swivel axis
20 locking pawl
21 ratchet tooth of the locking pawl
22 contact surface of the locking pawl in the disengaged condition of the parking lock
23 contact surface of the locking pawl in the engaged condition of the parking lock
24 support section of the locking pawl for the spring element
30 parking interlock gear
31 tooth space of the parking interlock gear
40 guide rod
41 fastening of the guide rod in the roller cage
42 suspension section of the guide rod for the spring element
43 support contour of the guide rod; contour at the suspension section
44 central axis of the guide rod
45 angle
50 actuating device
51 operative connection of the actuating device
60 interlocking element
61 first roller of the interlocking element
62 second roller of the interlocking element
63 roller cage of the interlocking element
64 stop bolt of the roller cage
65 recess in the roller cage for the guide rod
70 support
71 bolted connection of the support
72 pawl pin receptacle of the support
73 guiding plate of the support
74 bearing point in the support for the guide rod
75 stop in the support for the stop bolt of the roller cage in the engagement position P_aus
76 stop in the support for the stop bolt of the roller cage in the engagement position P_ein
80 spring element; leg spring
81 coil of the leg spring
82 first leg of the leg spring
83 first free end of the spring element; locking pawl-side angular bend of the leg spring
84 second leg of the leg spring
85 second free end of the spring element; connecting rode-side angular bend of the leg spring
90 engagement spring; compression spring
P_aus disengaged condition of the parking lock
P_ein engaged condition of the parking lock
V preload force curve; torque curve (prior art)
V_a preload reduction; torque reduction (prior art)
V_min minimum force; minimum torque
V1 to V3 preload force curve; torque curve (according to the invention)
X x-axis; travel
Y y-axis; preload force of the spring element; torque at the locking pawl

The invention claimed is:

1. A parking lock for a motor vehicle, comprising:
a locking pawl (20) pivotably mounted on a pawl pin (10), the locking pawl (20) configured to engage into or disengage from a parking interlock gear (30);
an interlocking element (60) axially displaceable during engagement and disengagement of the parking lock, the interlocking element (60) clamped between the locking pawl (20) and a housing-affixed guiding plate (73) in an engaged condition (P_ein) of the parking lock in order to prevent the locking pawl (20) from being pushed out of a tooth space (31) of the parking interlock gear (30);
an actuating device (50) operable to act in an axial direction upon the interlocking element (60) in order to disengage the parking lock;
a guide rod (40) connected or operatively connected to the interlocking element (60), the guide rod (40) axially displaced during the engagement and disengagement of the parking lock; and
a spring element (80) preloading the locking pawl (20) in a disengagement direction of the parking lock,
wherein a first free end (83) of the spring element (80) is supported directly on a support section (24) of the locking pawl (20) and rests against the support section (24) of the locking pawl (20) in a stationary manner during pivoting of the locking pawl (20),
wherein a second free end (85) of the spring element (80) is supported directly on a support contour (43) of the guide rod (40), and the second free end (85) of the spring element (80) slides along the support contour (43) of the guide rod (40) and moves in a translatory manner in relation to the guide rod (40) during an axial movement of the guide rod (40),
wherein a geometry of the support contour (43) is configured such that a preload force of the spring element (80) does not decrease during the disengagement of the parking lock.

2. The parking lock of claim 1, wherein the support contour (43) is configured such that the preload force of the spring element (80) progressively increases during the disengagement of the parking lock depending on the geometry of the support contour (43) and the axial movement of the guide rod (40).

3. The parking lock of claim 2, wherein the support contour (43) has a convex curvature extending along the axial direction, along a longitudinal direction of the guide rod (40), or along both the axial direction and the longitudinal direction of the guide rod (40) when viewed toward the guiding plate (73).

4. The parking lock of claim 2, wherein the support contour (43) is a circular arc segment extending along the axial direction, along a longitudinal direction of the guide rod (40), or along both the axial direction and the longitudinal direction of the guide rod (40), and a center of the circular arc segment is arranged on a side of the guide rod (40) facing toward the locking pawl.

5. The parking lock of claim 1, wherein the support contour (43) is configured such that the preload force of the spring element (80) remains constant during the disengagement of the parking lock.

6. The parking lock of claim 1, wherein the support contour (43) is configured such that the preload force of the spring element (80) linearly increases during the disengagement of the parking lock depending on the axial movement of the guide rod (40).

7. The parking lock of claim 6, wherein the support contour (43) is a straight linear segment extending along the axial direction, along a longitudinal direction of the guide rod (40), or along both the axial direction and the longitudinal direction of the guide rod (40), and the straight linear segment is slanted at an angle (45) with respect to a central axis (44) of the guide rod (40).

8. The parking lock of claim 1, wherein the support contour (43) is configured such that the preload force of the spring element (80) degressively increases during the disengagement of the parking lock depending on the geometry of the support contour (43) and the axial movement of the guide rod (40).

9. The parking lock of claim 8, wherein the support contour (43) has a concave curvature extending along the axial direction, along a longitudinal direction of the guide rod (40), or along both the axial direction and the longitudinal direction of the guide rod (40) when viewed toward the guiding plate (73).

10. The parking lock of claim 8, wherein the support contour (43) is a circular arc segment extending along the axial direction, along a longitudinal direction of the guide rod (40), or along both the axial direction and the longitudinal direction of the guide rod (40), and a center of the circular arc segment is arranged on a side of the guide rod (40) facing away from the locking pawl.

11. The parking lock of claim 1, wherein:
the spring element (80) comprises a leg spring, and coils (81) of the leg spring enclose a section of the pawl pin (10);
a first leg (82) of the leg spring is supported on the support contour (43) of the connecting rod (40) such that a free end (83) of the first leg (83) slides along the support contour (43) during an axial movement of the connecting rod (40); and
a second leg (84) of the leg spring is supported, with a free end (85) of the second leg (84), on a support section (24) of the locking pawl (20) in a stationary manner.

12. The parking lock of claim 1, wherein the actuating device (50) is operable to transmit an actuation force onto the interlocking element (60) via the guide rod (40) during the disengagement of the parking lock.

13. The parking lock of claim 1, wherein the actuating device (50) is operable to transmit an actuation force onto the interlocking element (60) without the guide rod (40) during the disengagement of the parking lock.

* * * * *